(12) United States Patent
Hammer

(10) Patent No.: US 6,905,070 B1
(45) Date of Patent: *Jun. 14, 2005

(54) BAR CODE SCANNER

(75) Inventor: Steven J. Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/324,229

(22) Filed: Dec. 19, 2002

(51) Int. Cl.$^7$ .................................................. G06K 7/10
(52) U.S. Cl. .............................. 235/462.4; 235/462.39; 235/462.32
(58) Field of Search ....................... 235/462.32, 462.36, 235/462.38, 462.39, 462.4

(56) References Cited

U.S. PATENT DOCUMENTS

| | | | | |
|---|---|---|---|---|
| 4,967,076 A | * | 10/1990 | Schuhmacher et al. ..... 250/236 |
| 5,149,949 A | * | 9/1992 | Wike, Jr. ............... 235/462.38 |
| 5,268,565 A | * | 12/1993 | Katoh et al. ........... 235/462.31 |
| 5,343,029 A | * | 8/1994 | Katoh et al. ........... 235/462.39 |
| 5,408,352 A | * | 4/1995 | Peng ......................... 359/203 |
| 5,464,972 A | * | 11/1995 | Massieu et al. ........ 235/462.38 |
| 5,555,125 A | * | 9/1996 | Peng ......................... 359/203 |
| 5,600,120 A | * | 2/1997 | Peng ....................... 235/462.39 |
| 5,979,767 A | * | 11/1999 | Schonenberg et al. .. 235/462.35 |
| 6,332,577 B1 | * | 12/2001 | Acosta et al. .......... 235/472.01 |
| 6,390,369 B1 | * | 5/2002 | Tang et al. .............. 235/462.4 |
| 6,460,767 B1 | * | 10/2002 | Knowles et al. ....... 235/462.37 |
| 6,568,598 B1 | * | 5/2003 | Bobba et al. .......... 235/462.39 |

* cited by examiner

*Primary Examiner*—Karl D. Frech
(74) *Attorney, Agent, or Firm*—Priest & Goldstein, PLLC

(57) ABSTRACT

A bar code scanner has a housing including a surface having a transparent scanning window. The housing contains optical components including a spinner mounted on a rotating motor; pattern mirrors and a collector for collecting light reflected from a bar code during scanning. Wherein the spinner is an inverted frusto-conical spinner with internal reflecting surfaces, the diameter of the spinner increasing as distance from the motor increases, and wherein the collector is mounted substantially within the body of the spinner.

24 Claims, 5 Drawing Sheets

FIG. 4a
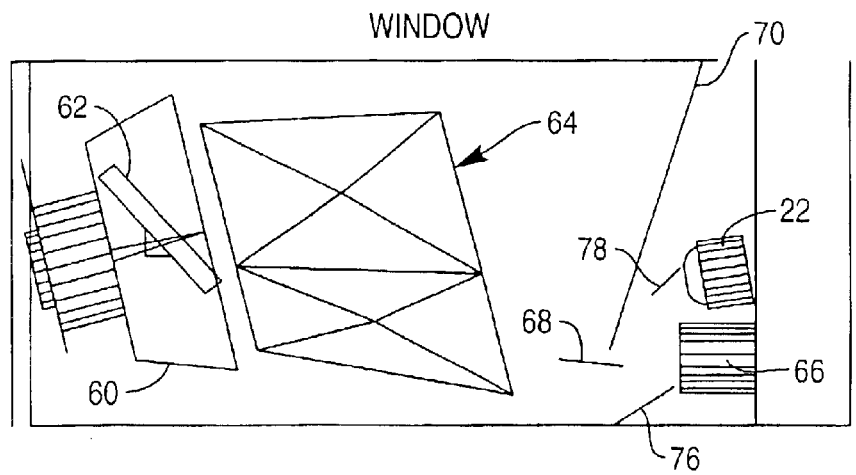
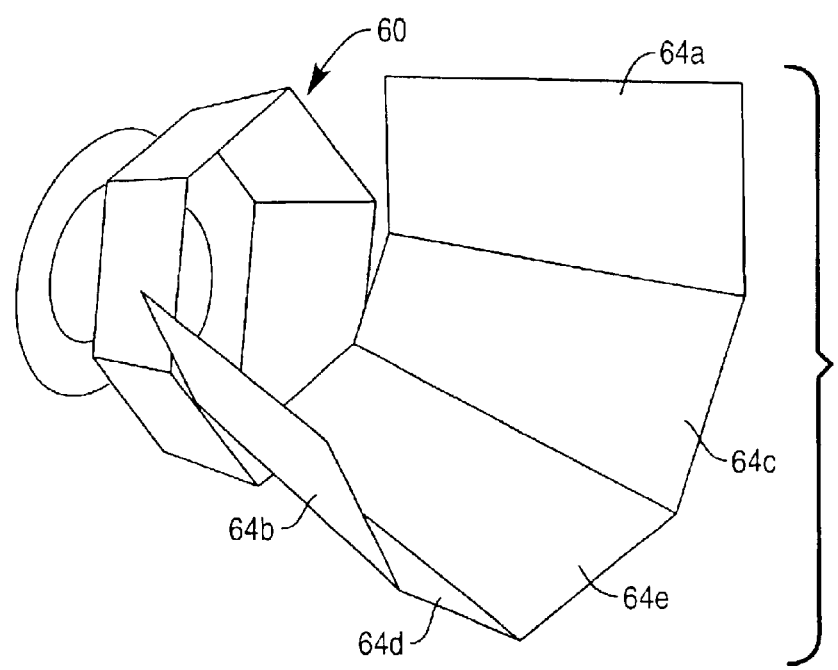
FIG. 4b

BAR CODE SCANNER

The present invention relates generally to bar code scanners and, more specifically, to scanners arranged to scan RSS bar code tags.

BACKGROUND OF THE INVENTION

Conventional bar codes have varying width bars and spaces suitably printed on a label. The bar code may take any conventional form in one or more dimensions, and includes, for example, the typical one-dimensional UPC form. The UPC symbology is based on a specification enacted by the Uniform Product Code Council, Inc. of Dayton Ohio. The typical UPC bar code includes a series or sequence of alternating dark bars and light spaces of varying widths. The bars and spaces are arranged in groups representing individual characters. The bar code starts with a left margin character and ends with a right margin character, and has a center reference character as well, with the characters provided there between representing any desired data.

The minimum width of either a bar or space in the UPC symbology is defined as a single module, which represents a unit width. The width of a single character coded using the UPC symbology is seven (7) modules. A seven module UPC character has two bar and two space elements which have varying widths to differentiate between the respective characters.

With the introduction of RSS bar code tags along side UPC tags into the market place, today's scanners must have higher density scan line patterns to be able to sustain high levels of performance. To consistently read the small RSS tags, the scanner must produce a scan pattern without any holes that would allow the tag to pass through without being read. The NCR 788X series single window bar code scanners have the highest density pattern available for this sized scanner, see FIG. 1a. However, its scan pattern is not dense enough for the small RSS tags.

Clearly there is a limit to the number and density of scan lines that can be produced by conventional scanners, without increasing the size of the scanner.

It is an object of the present invention to produce a bar code scanner, which obviates the problems discussed above.

SUMMARY OF THE INVENTION

According to a first aspect of the present invention there is provided a bar code scanner having a housing including a surface having a transparent scanning window; and containing optical components including an inverted spinner and pattern mirrors arranged to produce sets of densely packed scan lines According to a second aspect of the present invention there is provided a bar code scanner having a housing including a surface having a transparent scanning window; and containing optical components including a spinner and pattern mirrors, wherein the mirrors are arranged in a partial frusto-conical arrangement around the spinner.

According to a third aspect of the present invention there is provided a bar code scanner having a housing including a surface having a transparent scanning window; and containing optical components including, a spinner mounted on a rotating motor, pattern mirrors and a collector for collecting light reflected from a bar code during scanning, wherein the spinner is an inverted frusto-conical spinner with internal reflecting surfaces, the diameter of the spinner increasing as distance from the motor increases, and wherein the collector is mounted substantially within the body of the spinner.

An advantage of a bar code scanner in accordance with the present invention is that the scanner is cheaper and less complex to produce than prior art scanners of a comparable size. An additional advantage of the scanner in accordance with the present invention is that the scanner is capable of producing more densely packed scan lines than prior art scanners of a comparable size.

DESCRIPTION OF THE DRAWINGS

The invention, in accordance with preferred and exemplary embodiments, together with further objects and advantages thereof, is more particularly described in the following detailed description taken in conjunction with the accompanying drawings, in which:

FIGS. 4a to 4d are schematic representations of the optical arrangement of the scanner of FIG. 3.

DESCRIPTION OF THE PREFERRED EMBODIMENT

Figure 2:
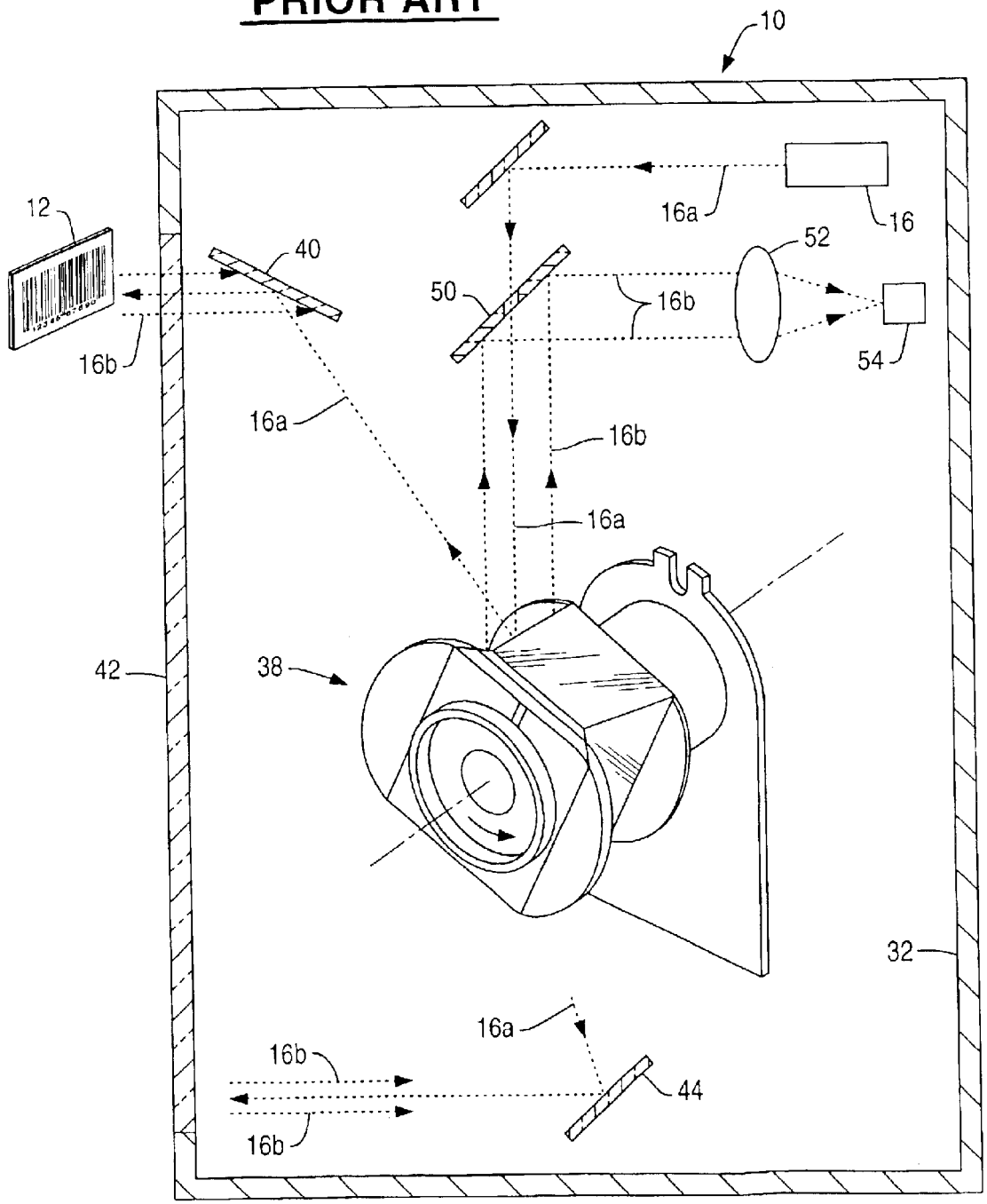
FIG. 2 is a schematic representation of a the optical arrangement of a prior art scanner.

FIG. 2 illustrates the optical arrangement of a prior art bar code scanner 10. The scanner includes a housing 32 in which its various operating components are suitably mounted.

A laser 16, typically in the form of a laser diode, is mounted in the housing for emitting an outbound laser beam 16a. A rotary spinner 38 is suitably disposed in the outbound optical beam path with the laser 16 for segmenting the beam in corresponding optical paths in alignment with a plurality of primary pattern mirrors 40 which reflect corresponding scan lines out a transparent window 42 of the scanner 10. The scan lines may be produced from direct reflection between the spinner and the primary pattern mirrors, or secondary pattern mirrors 44 may be optically aligned with corresponding ones of the primary pattern mirrors to produce the desired scan line pattern emitted through the scanning window 42.

The pattern mirrors may be oriented in the scanner housing 32 in any conventional manner for producing the desired scan line pattern for each revolution of the spinner 38. In this way, a conventional barcode 12 may be positioned in front of the window 42 for being traversed by any one or more of the scan lines in the pattern for returning reflected light 16b therefrom inbound in the opposite direction for collection by the pattern mirrors 40, 44 and rotating spinner 38 for decoding.

A suitable collection mirror 50 is suitably optically aligned between the laser 16 and the spinner 38, and may include a center aperture therein, through which the outbound scan beam 16a passes without obstruction. Since the reflected light 16b is diffuse from being reflected off the barcode 12, the pattern mirrors, spinner, and collection mirror 50 are suitably sized in area for collecting sufficient reflected light 16b for use in decoding the barcode.

The reflected or collection light 16b is reflected from the collection mirror 50 and focused through a suitable focusing lens 52 onto a conventional photodetector 54, which produces a corresponding electrical signal which is decoded in the electrical controller of the scanner in a conventional manner.

Figure 1A:
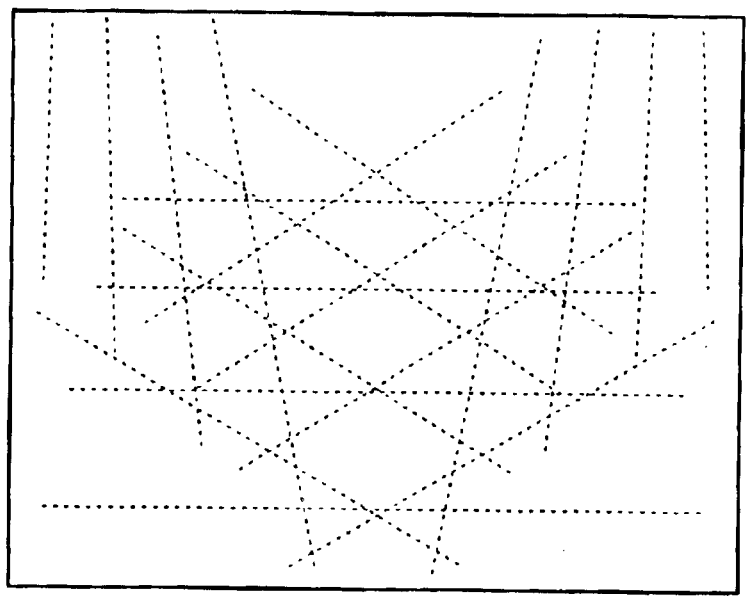
FIG. 1a illustrates a typical scan pattern for a prior art scanner of a comparable size to a scanner in accordance with the present invention.
Figure 3:
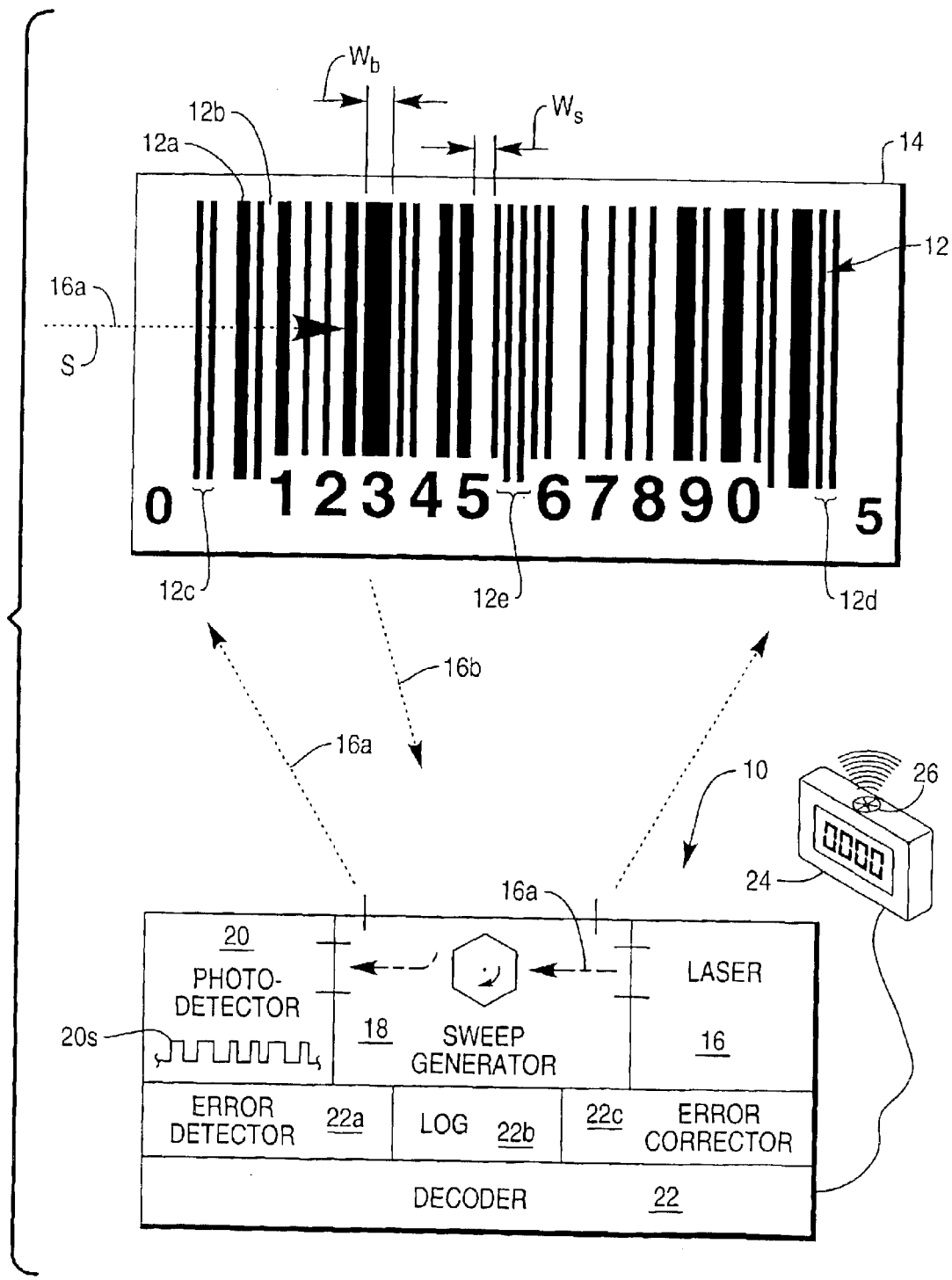
FIG. 3 is a schematic representation of a bar code scanner in accordance with the present invention.
Figure 4C:
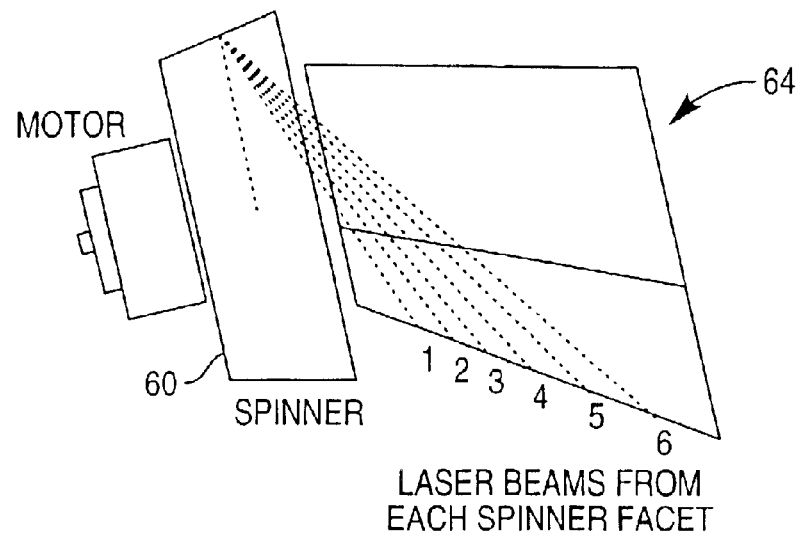
Figure 4D:
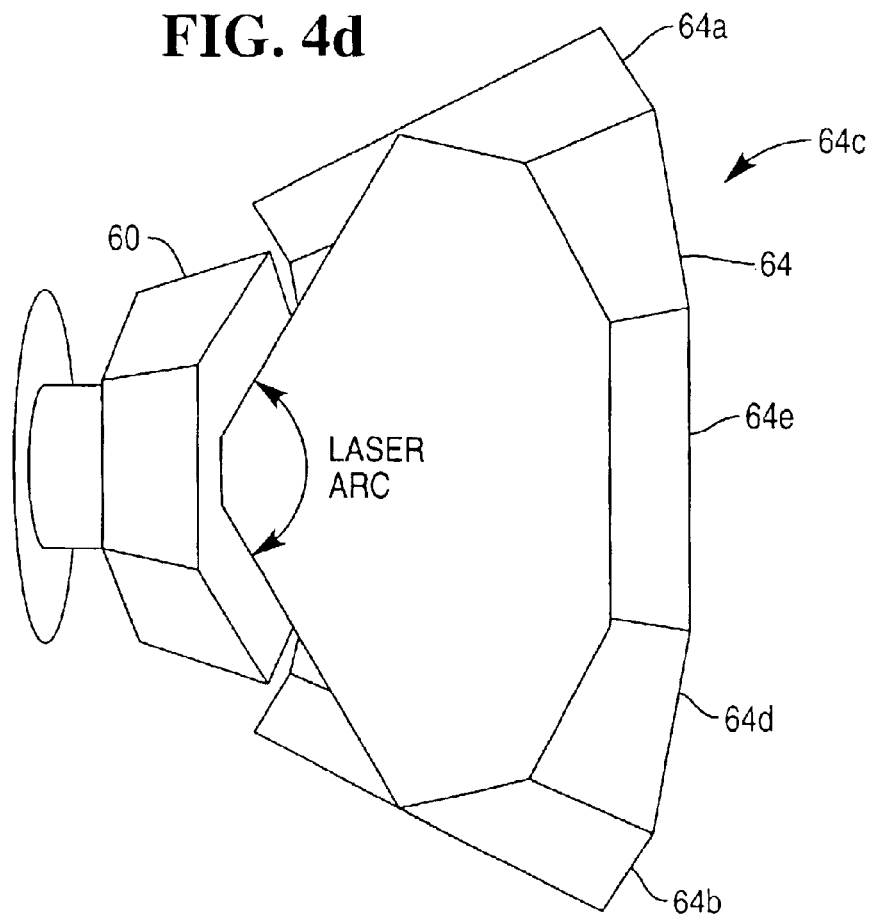

Illustrated schematically in FIG. 3 is a laser bar code scanner 10 for scanning and decoding a conventional bar code 12 printed on a suitable label 14. The bar code 12 may take any conventional form in one or more dimensions including the conventional one-dimensional UPC symbology illustrated. The exemplary bar code 12 illustrated in FIG. 1 includes a plurality of sequential or alternating dark bars 12a and white spaces 12b, which are straight and parallel to each other and have corresponding varying widths $W_b$ and $W_s$. The bars and spaces are arranged in a plurality of sequential groups defining respective characters of equal width. The minimum width of a bar or a space is defined as the minimum width module, and in the UPC symbology must exceed 9 mils by specification. A single UPC character is defined as having two bars 12a and two spaces 12b of varying widths. And, the specified widths of a single character coded using the UPC symbology must, by specification, be seven modules. Furthermore, the UPC symbology defines the maximum bar width as being four modules.

In the exemplary bar code 12 illustrated in FIG. 3, the bar code conventionally starts with a left margin character 12c, ends with a right margin character 12d, and has a center reference character 12d, with the remaining bars and spaces there between defining desired data characters. As indicated above, each of the data characters has a total width of seven modules and includes two bars and two spaces.

The exemplary scanner 10 illustrated in FIG. 3 includes conventional means for optically scanning the bar code 12 sequentially across the bars and spaces 12a,b over the total width of the bar code 12 from the left margin character 12c to the right margin character 12d. In the preferred embodiment illustrated, scanning is accomplished by using a conventional laser 16 which emits a suitable laser beam 16a which is suitably scanned across the face of the bar code 12 by a conventional sweep generator 18 which may take the form of a rotating multifaceted mirror 38. The laser beam 16a is scanned transversely across the bar code 12 in a scan direction S so that back scattered light 16b reflects off the bars and spaces back to the scanner. Since the bars 12a are dark, very little light is back scattered therefrom, whereas the spaces 12b are substantially white and more effectively backscatter light to the scanner.

A conventional photodetector 20 is provided in the scanner 10 and is suitably optically aligned therein for receiving the back scattered light 16b and producing an electrical bar code signature 20s alternating in intensity between maximum and minimum values corresponding with the back scattered light 16b from the spaces 12b and bars 12a, respectively. The time duration of the maximum and minimum intensity portions of the signature 20s corresponds with the varying widths of the bars and spaces. Since the scan beam 16a is scanned across the bar code 12 at a known and constant rate of speed, the bar code signature 20s is representative of the bar code 12 itself and may be decoded in a conventional decoder 22 specifically configured for the corresponding bar code symbology printed on the label 14.

The decoder 22 may take any conventional form and is typically a digitally programmable microprocessor containing suitable software for analyzing the bar code signature 20s and decoding the data contained therein. The scanner 10 is electrically joined to a suitable display 24 which may be used for displaying certain information encoded in the bar code 12, such as the price of a consumer product represented thereby. When the bar code 12 is accurately scanned and decoded, the data may be presented on the display 24, and a small speaker 26 operatively joined to the scanner 10 may beep to indicate successful decoding of the bar code 12.

The bar code scanner of FIGS. 4a–d is functionally the same as that detailed in FIG. 3, although the arrangement of the optical components are very different to those of the prior art arrangement illustrated in FIG. 2, as will be described below.

The scanner of FIGS. 4a to 4d includes an inverted polygon spinner 60 and a collector 62 placed substantially within the body of the spinner for a compact optical design allowing greater volume and optical path length for the generation of scan lines. The spinner is 6 sided and the scanner contains 5 pattern mirrors 64a to 64e to generate 30 scan lines total. There are 6 horizontal scan lines (from mirror 64e), 12 diagonal lines (from mirrors 64c & 64d) and 12 vertical lines (from mirrors 64a & 64b). The spinner 60 is mounted substantially vertically with a slight tilt backwards as shown in the aforementioned figures, for compactness and for proper scan line orientation. The inverted spinner has mirrored reflective internal facets, thus allowing the placement of the collector within the spinner, unlike normal spinners in which the outer facets are reflective.

Figure 1B:
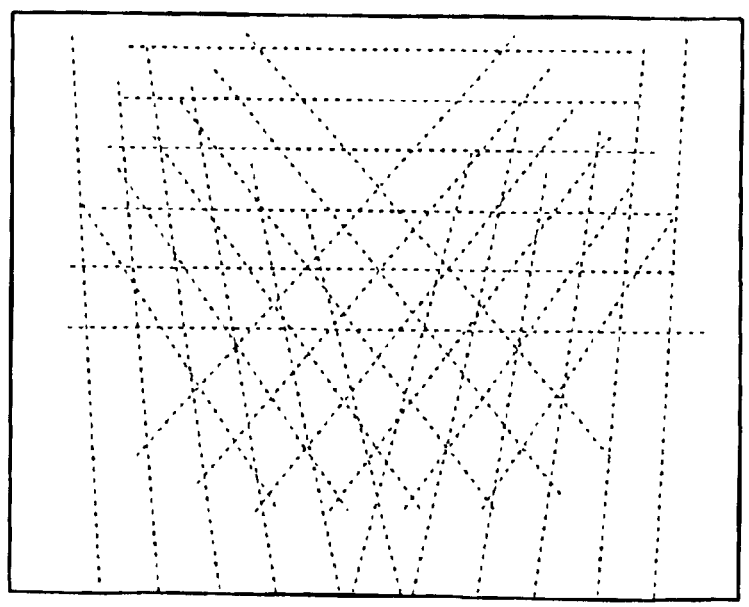
FIG. 1b illustrates the scan pattern for a scanner in accordance with the present invention.

As illustrated in FIG. 4b, the pattern mirrors 64a to 64e are laid out such that they form a partial shell or cone around the inverted spinner 60, starting opposite the spinner facet which reflects the laser out of the spinner, when in use. As the spinner rotates, the laser beam reflects off of each facet, tracing out an arc of light for each spinner facet, see FIG. 4d. Each spinner facet is at a unique angle to produce a unique arc of light. The arc of light is then intercepted by the shell of pattern mirrors. The pattern mirrors are angled such that the right and left vertical mirrors will form vertical scan lines, the right and left diagonal mirrors form diagonal scan lines, and the horizontal mirror will form horizontal scan lines. The pattern mirrors are large enough to intercept all the scan lines, with excess room for tolerance buildup, alignment errors, and return light collection. Thus the dense scan pattern illustrated in FIG. 1b is created by the scanner in accordance with the present invention. The passage of light through the scanner is best described with reference to FIG. 4a. When in use, light is emitted from the laser 66, which is reflected, in turn, from the laser mirror 68, the spinner 60, the pattern mirrors 64a to 64e and finally the exit mirror 70. From the exit mirror the laser light, in the form of scan lines, exits the scanner through the window 72, whereupon it strikes a bar code to be scanned. Reflected light from the bar code is directed back into the scanner, off of the exit mirror, the pattern mirrors, the spinner and the collector 62 and mirrors 76 and 78 into the detector 22.

The foregoing description of the preferred embodiment of the invention has been presented for the purposes of illustration and description. It is not intended to be exhaustive or to limit the invention to the precise form disclosed. Many modifications and variations are possible in light of the above teaching. For example, the configuration of mirrors is not the only configuration, which will produce a useable scan pattern with the inverted spinner. It is intended that the scope of the invention be limited not by this detailed description, but rather by the claims appended hereto.

I claim:

1. A bar code scanner having a housing including a surface having a transparent scanning window; and containing optical components including an inverted spinner, the spinner being hollow and having internal reflecting surfaces, with the elements of the spinner being fixed with respect to one another, and an array of fixed pattern mirrors arranged in a partial shell around the inverted spinner, the array of mirrors being disposed about an open end of the spinner such that a laser beam entering the spinner through the open end is deflected by a facet of the spinner out the open end of the spinner to the array of mirrors to produce a scan beam, the array of mirrors being arranged in close proximity with the spinner in such a way as to produce sets of densely packed scan lines while the spinner and mirrors take up relatively little space within the scanner.

2. The bar code scanner of claim 1. further comprising a single light source.

3. The bar code scanner of claim 2, wherein the light source is a laser light source.

4. The bar code scanner of claim 2, wherein the light source is a light emitting diode.

5. The bar code of claim 1, wherein there are five pattern mirrors.

6. The bar code scanner of claim 5, wherein there are two diagonal pattern mirrors, two vertical pattern mirrors and one horizontal pattern mirror.

7. The bar code scanner of claim 1, wherein the spinner has six facets.

8. The bar code scanner of claim 7, wherein each of the facets is mounted at a different angle to the axis of rotation of the motor.

9. A bar code scanner having a housing including a surface having a transparent scanning window; and containing optical components including a spinner, the spinner being hollow and having internal reflecting surfaces, with the elements of the spinner being fixed with respect to one another, and an array of fixed pattern mirrors, wherein the mirrors are arranged in a partial frusto-conical arrangement around the spinner, the array of mirrors being disposed about an open end of the spinner such that a laser beam entering the spinner through the open end is deflected by a facet of, the spinner out the open end of the spinner to the array of mirrors to produce a scan beam, the mirrors being arranged in close proximity with the spinner in such a way as to produce sets of densely, packed scan lines while the spinner and mirrors take up relatively little space within the scanner.

10. The bar code scanner of claim 9, further comprising a single light source.

11. The bar code scanner of claim 10, wherein the light source is a laser light source.

12. The bar code scanner of claim 10, wherein the light source is a light emitting diode.

13. The bar code of claim 9, wherein there are five pattern mirrors.

14. The bar code scanner of claim 13, wherein there are two diagonal pattern mirrors, two vertical pattern mirrors and one horizontal pattern mirror.

15. The bar code scanner of claim 9, wherein the spinner has six facets.

16. The bar code scanner of claim 15, wherein each of the facets is mounted at a different angle to the axis of rotation of the motor.

17. A bar code scanner having a housing including a surface having a transparent scanning window; and containing optical components including a spinner mounted on a rotating motor, an army of fixed pattern mirrors and a collector for collecting light reflected from a bar code during scanning, wherein the spinner is an inverted frusto-conical spinner with internal reflecting surfaces, the elements of the spinner being in fixed positions with respect to one another, the diameter of the spinner increasing as distance from the motor increases, and wherein the collector is mounted so as to be disposed substantially within the body of the spinner, the collector being mounted in such a way that the collector does not move with the rotation of the spinner.

18. The bar code scanner of claim 17, further comprising a single light source.

19. The bar code scanner of claim 18, wherein the light source is a laser light source.

20. The bar code scanner of claim 18, wherein the light source is a light emitting diode.

21. The bar code of claim 17, wherein there are five pattern mirrors.

22. The bar code scanner of claim 21, wherein there are two diagonal pattern mirrors, two vertical pattern mirrors and one horizontal pattern mirror.

23. The bar code scanner of claim 17, wherein the spinner has six facets.

24. The bar code scanner of claim 23, wherein each of the facets is mounted at a different angle to the axis of rotation of the motor.

* * * * *